US010137974B2

(12) United States Patent
Ahlen et al.

(10) Patent No.: US 10,137,974 B2
(45) Date of Patent: Nov. 27, 2018

(54) MONUMENT FOR A CABIN OF A VEHICLE, AND FASTENING ARRANGEMENT

(71) Applicant: Airbus Operations GmbH, Hamburg (DE)

(72) Inventors: Tim von Ahlen, Hamburg (DE); Daniel Hiebing, Hamburg (DE); Ansgar Josef Fennen, Hamburg (DE); Falk Bajorat, Hamburg (DE); Christian Lübbering, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 102 days.

(21) Appl. No.: 15/099,074

(22) Filed: Apr. 14, 2016

(65) Prior Publication Data

US 2016/0304183 A1   Oct. 20, 2016

(30) Foreign Application Priority Data

Apr. 15, 2015  (DE) .................. 10 2015 206 707

(51) Int. Cl.
| | | |
|---|---|---|
| *B64C 1/06* | (2006.01) | |
| *B64C 1/00* | (2006.01) | |
| *B64D 11/00* | (2006.01) | |
| *B64D 11/06* | (2006.01) | |
| *F16M 13/02* | (2006.01) | |

(52) U.S. Cl.
CPC ............... *B64C 1/00* (2013.01); *B64D 11/00* (2013.01); *B64D 11/0696* (2013.01); *F16M 13/022* (2013.01); *B64D 2011/0046* (2013.01); *Y02T 50/46* (2013.01)

(58) Field of Classification Search
CPC ... B64D 11/00; B64D 11/0023; B64D 11/003; B64D 11/0696; B64D 11/0697; B64D 2011/0046; B64D 2011/0092
See application file for complete search history.

(56) References Cited

U.S. PATENT DOCUMENTS 6,883,753 B1   4/2005  Scown
8,528,859 B2   9/2013  Gross et al.
(Continued)

FOREIGN PATENT DOCUMENTS

DE   102005054890 A1   5/2007
DE   102008064120 A1   7/2010
(Continued)

OTHER PUBLICATIONS

German Patent Office, German Search Report for German Patent Application No. 102015206707.6 dated Apr. 11, 2016.
(Continued)

*Primary Examiner* — Richard G Davis
(74) *Attorney, Agent, or Firm* — Lorenz & Kopf LLP

(57) ABSTRACT

A monument for a cabin of a vehicle, in particular of an aircraft or spacecraft, having an outer housing side and a fastening rail for fastening connection elements in a longitudinal direction of the fastening rail in order to fix the monument in position inside the cabin, wherein the fastening rail has a receiving space extending in the longitudinal direction of the fastening rail, which space is designed to receive and fasten mounting feet of the connection elements to the fastening rail, and wherein the fastening rail is integrated in the outer housing side.

17 Claims, 2 Drawing Sheets

(56) References Cited

U.S. PATENT DOCUMENTS

| | | | |
|---|---|---|---|
| 2006/0038071 A1 | 2/2006 | Schoene | |
| 2008/0277527 A1* | 11/2008 | Fokken | B61D 17/18 244/118.1 |
| 2009/0084925 A1 | 4/2009 | Kismarton | |
| 2011/0011978 A1* | 1/2011 | Haack | B64C 1/18 244/119 |
| 2012/0228431 A1* | 9/2012 | Umlauft | B64C 1/406 244/131 |
| 2012/0248245 A1* | 10/2012 | Schliwa | B61D 35/00 244/118.5 |

FOREIGN PATENT DOCUMENTS

| | | |
|---|---|---|
| DE | 102009014598 A1 | 9/2010 |
| DE | 102010011219 A1 | 9/2011 |
| DE | 102011055010 A1 | 5/2012 |
| DE | 102012005934 A1 | 9/2013 |
| EP | 2436599 A2 | 4/2012 |
| JP | 2011126296 A | 6/2011 |
| WO | 9809860 A1 | 3/1998 |
| WO | 2010024990 A1 | 3/2010 |

OTHER PUBLICATIONS

European Patent Office, Extended European Search Report for European Patent Application No. 16164836.5 dated Aug. 11, 2016.

* cited by examiner

MONUMENT FOR A CABIN OF A VEHICLE, AND FASTENING ARRANGEMENT

CROSS-REFERENCE TO RELATED APPLICATION

This application claims priority to German Patent Application No. 102015206707.6, filed Apr. 15, 2015, which is incorporated herein by reference in its entirety.

TECHNICAL FIELD

The embodiments described herein relate to a monument for a cabin of a vehicle and to a fastening arrangement for fastening such a monument inside a cabin. In particular, the present embodiments relates to a monument and to a fastening arrangement for an aircraft cabin, for example of a passenger aircraft.

BACKGROUND

In addition, other objects, desirable features and characteristics will become apparent from the subsequent summary and detailed description, and the appended claims, taken in conjunction with the accompanying drawings and this background.

Although the present cabin monument and the associated fastening arrangement can be used in various types of vehicles, these and the problem addressed thereby are described in greater detail in relation to an aircraft cabin. In principle, however, the present embodiments can also be used in spacecraft, watercraft, rail vehicles or the like.

In addition to the passenger seats, aircraft cabins of passenger aircraft also comprise fixtures that are provided for use by the crew or the passengers of the aircraft. Such fixtures in an aircraft passenger cabin comprise for example storage lockers, toilets, galleys, bar fixtures etc. and are also referred to as monuments. Due to the naturally restricted space available in aircraft cabins, such monuments have a very integrated and compact structure and are additionally frequently provided as integral modules.

Such monuments are typically anchored in a fixed position on the housing thereof in a corresponding installation position inside the aircraft cabin. For example, a metal perforated rail can be mounted on a housing upper surface of a monument by means of screws, which upper surface in turn can be fastened to a primary structure of the aircraft by means of additional metal components, such as mounting brackets, connecting rods or the like. In order to allow as flexible attachment as possible, such perforated rails can be provided with regularly spaced holes, in which the additional connection elements can be fixed in a longitudinal direction of the rail at regular intervals.

Conventionally, such components for fastening monuments are produced from aluminium or a corresponding metal or metal alloy, for example by means of an extrusion process. However, for the purpose of weight reduction, the cabin components of modern passenger aircraft are increasingly constructed from fibre composite materials. For example, the housing walls of monuments are sometimes structured in sandwich constructions, a core made of polymeric honeycomb structures or foams being surrounded in each case by two panels made of glass-fibre-reinforced or carbon-fibre-reinforced plastics material. In contrast to the light composite components used in this case, the metal components of a monument fastening have a relatively high weight.

DE 10 2005 054 890 A1 and U.S. Pat. No. 8,528,859 B2 describe for example systems for fixing monuments in position in aircraft cabins, in which a plurality of individual metal components are used for fastening. The system from DE 10 2005 054 890 A1 thus provides a system carrier for fixing interior fitting components at the heads thereof, which is fastened to a fuselage by means of a plurality of formers and is equipped with a plurality of fastening means for connecting the interior fitting components. Furthermore, said system provides at least one fastening rail which is located in a cabin floor, which extends in parallel with the system carrier and along which are located corresponding fastening means for fixing the interior fitting components at the feet thereof.

SUMMARY

In view of the above, it is an object to provide a lightweight, multi-functional fastening of monuments that is particularly simple to assemble and that ensures a stable and secure positioning by means of as few individual components as possible.

A monument for a cabin of a vehicle has an outer housing side and a fastening rail for fastening connection elements in a longitudinal direction of the fastening rail in order to fix the monument in position inside the cabin. The fastening rail has a receiving space extending in the longitudinal direction of the fastening rail, which space is designed to receive and fasten mounting feet of the connection elements to the fastening rail. The fastening rail is integrated in the outer housing side.

Furthermore, a fastening arrangement for fixing such a monument in position inside a cabin of a vehicle is provided. The fastening arrangement comprises a monument according to the embodiments. The fastening arrangement further comprises a connection element having at least two mounting feet that are mounted at a distance from one another in the fastening rail of the monument. Furthermore, the fastening arrangement comprises a tension rod, which is mounted on the connection element, is connected to a structure of the aircraft or spacecraft, and fixes the monument in a position inside the cabin by means of the connection element.

A present embodiment is based on the concept of providing a fastening system for cabin monuments, in which a fastening rail is integrated in an outer side of the monument in question. Monuments according to the embodiments consequently provide a connection possibility, which can be positioned and optimally designed in accordance with each monument.

A particular advantage of the solution according to the embodiments is that integrating a fastening rail in a monument makes it possible to save weight. At the same time, a fastening rail of this type reinforces the structure of the corresponding housing side of the monument and thus the monument per se. The housing of a monument according to the embodiments is used in this case both as a fastening interface of the monument and as reinforcement for the monument structure. As a result, the entire fastening arrangement is also simplified since fewer individual parts are required. This saves not only weight and therefore fuel, but also, in general, costs and installation expenditure due to the simplified assembly.

It would be clear to a person skilled in the art that a monument according to the present embodiments can likewise be designed to have a plurality of fastening rails of this type. The fastening rails can be integrated in various housing sides, e.g. a lower surface and an upper surface, or next to one another on the same housing side, e.g. two parallel fastening rails in an upper surface of a monument.

Advantageous embodiments and developments are set out in the further dependent claims and in the description with reference to the drawings.

The fastening rail can be designed as a notch in a wall of the outer housing side. In this embodiment, the notch forms the fastening rail to some extent, for example said rail can be incorporated in the wall as a groove or slot. The notch can be produced integrally with the wall, e.g. as a carbon-fibre-reinforced plastics component in a pultrusion process. The notch can be structured specifically to reinforce the wall in an optimum manner.

According to alternative developments of the monument, a notch can be provided in a wall of the outer housing side, into which the fastening rail is inserted. In contrast with the above-mentioned embodiment, the fastening rail can be fastened in this case only retroactively in the notch, e.g. the notch can be milled into a sandwich panel and can subsequently be adhered in a metal rail. In another possible embodiment, however, a plastic rail is already inserted into the notch during the process of producing the wall.

In this development of the monument, the fastening rail can be inserted into the notch such that the fastening rail and the wall are flush with the outer housing side. In this advantageous development, the fastening interface of the monument is space-saving and is incorporated in the monument in an unobtrusive manner.

In this case, the fastening rail can be adhered in the notch. For example, the wall of the housing can be a sandwich panel made of fibre-reinforced plastics material, in which a plastics rail or metal rail is adhered. Adhesively bonding components allows simplified assembly. In addition, by means of adhesive bonds, in many applications weight can be saved by comparison with purely mechanical connections by means of screws, rivets, studs or the like.

According to some developments of the monument, the fastening rail can be formed having a plurality of regularly spaced holes in the receiving space. The holes can be designed to receive and fasten mounting feet of connection elements to the fastening rail. Both the holes and the mounting feet can be standardised in this case. In this development, connection elements can consequently be attached to the monument in a particularly flexible and variable manner. The monument can thus be attached in an aircraft cabin differently according to the respective needs or conditions.

According to some developments of the monument, the fastening rail can have a C profile. For example, the notch can be designed as a simple slot in the wall of the monument housing, in which slot the fastening rail can simply be slid in, during installation, from one end of the housing side of the monument and adhered in said slot. In one advantageous embodiment, the fastening rail can be flush with the wall of the housing side. The receiving space of the fastening rail can moreover be open towards one end of the housing side so that mounting feet of connection elements of a corresponding design can simply be slid into the C-shaped opening. This could then be fixed in a desired position, e.g. by means of screws, studs, adhesive connections, twist locks etc. In principle, the conventional mounting methods which are known to a person skilled in the art can be used for fixing the mounting feet, as are also used in the case of other fields of application of fastening rails, for example seat rails.

According to some developments of the monument, the fastening rail can be in the form of a seat rail. In contrast to the perforated rails conventionally used for fixing monuments in position, seat rails are designed to be considerably lighter and more space-efficient. In particular, standardised seat rails can be used so that no specific cost-intensive solutions are required for each fastening. For example, the notch can be designed as a simple slot in the wall of the monument housing, in which slot a seat rail made of metal can simply be slid in from one side of the monument and adhered. The seat rail advantageously further provides prefabricated and standardised holes, via which corresponding mounting feet can be attached to the fastening rail. For example, the "fittings" made of plastics material or metal which are conventionally used to fasten seats can be used.

According to some developments of the monument, the fastening rail can be produced substantially from fibre-reinforced plastics material. This has the considerable advantage that the fastening rail can already be incorporated in the wall of the housing side during the production thereof or can even be produced integrally with the wall, e.g. in a continuous production process such as pultrusion or the like. In this development, the monument can be produced to be particularly lightweight and economical.

According to some developments of the fastening device, a pivot bearing can be provided in the connection element, on which bearing the tension rod is pivotally mounted. In this case, the tension rods can be fastened to the pivot bearing for example by one end simply by means of a screw or a stud. The other end can be pivoted for mounting in the desired position and likewise be connected there for example to a primary structure of the vehicle by means of studs or screws or the like.

According to some developments of the fastening device, rod-shaped connecting struts can be provided in the connection element, which struts each connect one of the mounting feet respectively of the connection element to the pivot bearing. Due to the integration of the fastening rails in the housing side of the monument, the connection element has to be longer when the monument has a predetermined installation space in the cabin. In order to avoid an increase in weight, the connection element can be formed having thin and/or hollow rod-shaped or tubular connecting struts. Said struts can moreover comprise reinforcing structures, such as longitudinal ribs or the like. The present embodiment is not restricted in this case to connecting struts having a circular profile, but rather also provides rectangular or more complex profiles.

Two connecting struts of the connection element can form an isosceles triangle together with the outer housing side. In one advantageous embodiment, the connection element can consist of two connecting struts, which are mounted on a pivot bearing and are each mounted on the fastening rail by means of a fitting. This development is simple, flexible and strong. In principle, a differently designed arrangement of connecting struts can, however, also be used, e.g. having 3, 4 or more connecting struts.

According to some developments of the fastening device, the connecting struts can be produced from fibre-reinforced plastics material. For example, the connecting struts can be pultruded, hollow or solid carbon profiles, i.e. can consist of carbon-fibre-reinforced plastics material (CFRP). Such connecting struts can be produced in a particularly economical manner and can have a high level of strength and rigidity at a low weight. Alternatively, embodiments made of metal, such as aluminium or titanium, are, however, also provided. The connecting struts can, for example, be bonded to a pivot bearing and to mounting feet and/or fastened thereto by means of interference fits, screw-in connections or the like.

The embodiments and developments above can be combined with one another as desired where appropriate. Further possible embodiments, developments and implementations of the embodiments also do not comprise explicitly mentioned combinations of features of the embodiments described previously or in the following with respect to the embodiments. In particular in this case, a person skilled in the art will also add individual aspects as improvements or supplements to each basic form of the present embodiments.

BRIEF DESCRIPTION OF THE DRAWINGS

The various embodiments will hereinafter be described in conjunction with the following drawing figures, wherein like numerals denote like elements, and.

DETAILED DESCRIPTION

Figure 1:
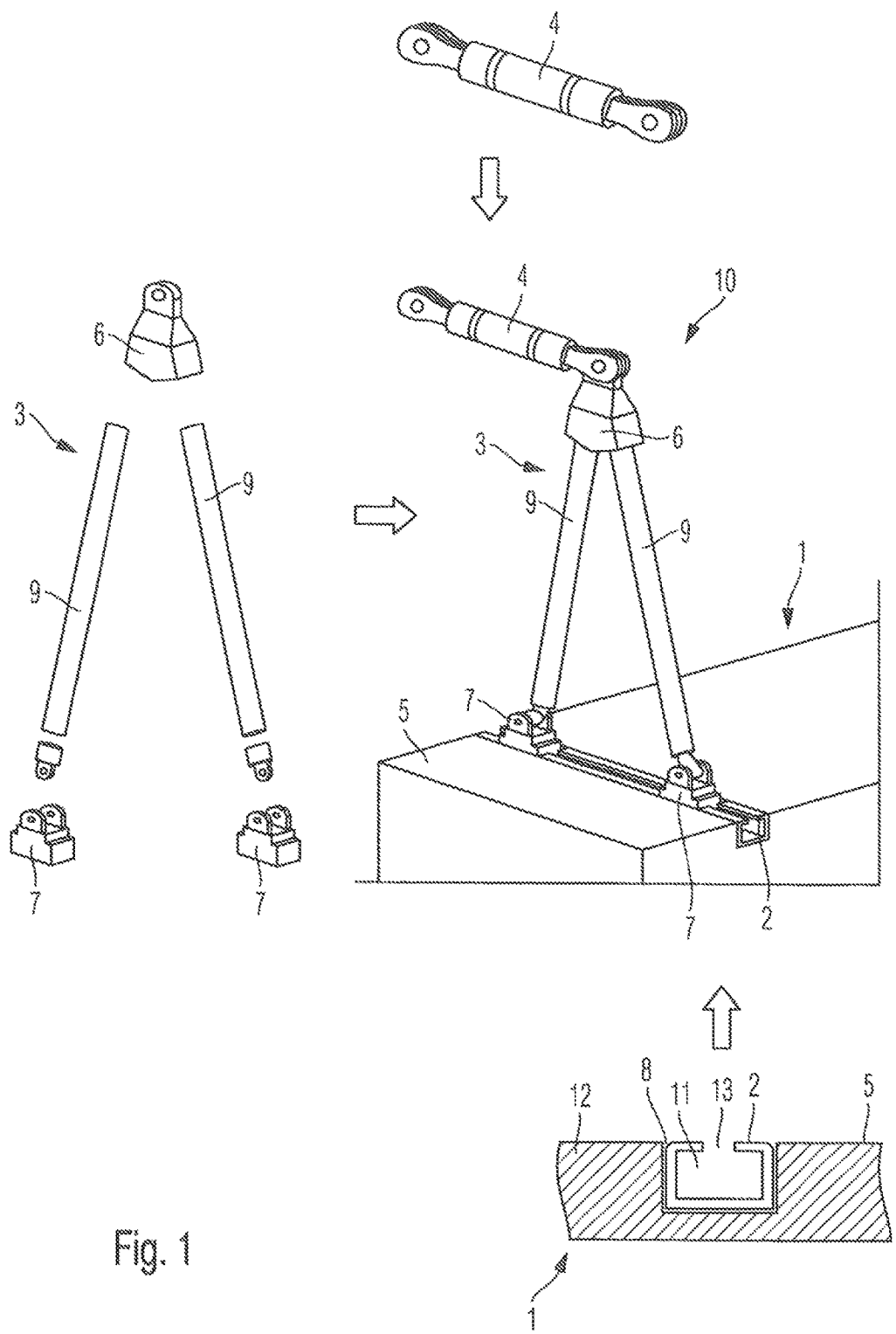
FIG. 1 is a schematic perspective view of a fastening arrangement.

The following detailed description is merely exemplary in nature and is not intended to limit the disclosed embodiments or the application and uses thereof. Furthermore, there is no intention to be bound by any theory presented in the preceding background detailed description.

The accompanying drawings are intended to provide further understanding of possible embodiments. They illustrate embodiments and are used, in conjunction with the description, to explain principles and concepts of the embodiments. Other embodiments and many of the above-mentioned advantages emerge from the drawings. The elements of the drawings are not necessarily shown to scale with respect to one another. In the figures of the drawings, elements, features and components which are like, functionally like or have the same effect, unless otherwise specified, are each provided with the same reference numerals.

FIG. 1 is a schematic perspective view of a fastening arrangement, according to one embodiment.

Figure 2:
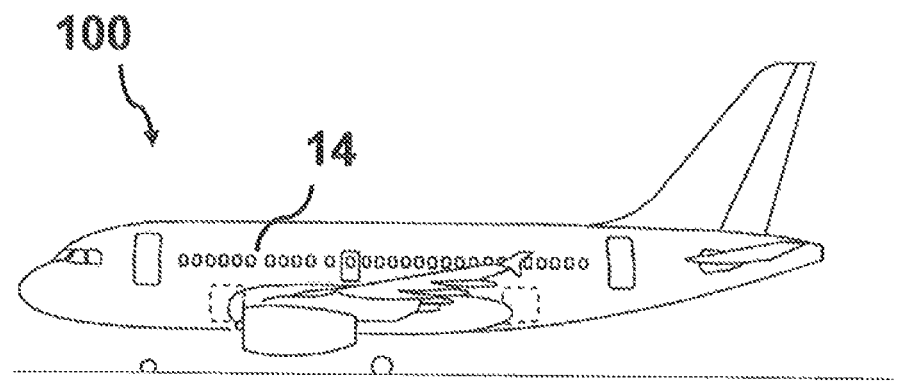
FIG. 2 is a schematic side view of an aircraft comprising a cabin in which the fastening arrangement from FIG. 1 is mounted.

In FIG. 1, reference numeral 10 denotes a fastening arrangement. The fastening arrangement 10 comprises three basic components: a monument 1 having a fastening rail 2 integrated therein, a connection element 3 and a tension rod 4. As shown in the centre of FIG. 1, the monument 1 is fastened to a structure inside an aircraft 100, for example a passenger aircraft, by means of the connection element 3 and the tension rod 4 mounted thereon. For reasons of clarity, the structure and the cabin 14 have been omitted from FIG. 1. By way of example, such an aircraft 100 is shown in FIG. 2, in which the position of a cabin 14 is indicated (in this case, the cabin is a passenger cabin). The structure can be a primary structure of the aircraft 100, for example an attachment point of an aircraft former which fixes the monument 1 in a position in the aircraft cabin 14. The three components are each shown again separately in FIG. 1 (the fastening rail 2 at the bottom, the connection element 3 on the left and the tension rod 4 at the top), arrows indicating position of the fastening arrangement 10 in which they are found.

In the embodiment shown in FIG. 1, the monument 1 is a box-shaped fixture for an aircraft cabin 14. In this case, the monument can be for example a storage locker or a galley or the like. In principle, the solution according to the embodiments can be applied to various monuments which are to be positioned in an aircraft cabin 14 in a stationary manner. The monument 1 has, inter alia, an outer housing side 5 (upper surface of the monument 1), which comprises a wall 12 having a fastening rail 2 integrated therein. In this case, the fastening rail 2 is inserted into a notch 8, provided therefor, in the wall 12 of the housing side 5, and is flush with the wall 12 of the housing side 5.

The wall 12 can for example be a sandwich panel in a composite construction, for example a sandwich panel having a core structure made of a foam, and having plane-parallel cover layers applied to both sides. The cover layers can be formed for example by a fibre-reinforced plastics material, such as a glass-fibre-reinforced phenol resin or a carbon-fibre-reinforced epoxy resin. Alternatively or additionally, the core structure can in this case also comprise synthetic polymer paper arranged in the manner of honeycomb, e.g. an aramid paper or the like. Such designs of the walls of monument housings are characterised inter alia by a low weight, high stability and optimum heat- and/or sound-insulation properties.

The fastening rail 2 is designed for fastening the connection element 3. For this purpose, the fastening rail 2 has a receiving space 11 extending in a longitudinal direction of the fastening rail 2. Holes 13 lead into the receiving space 11, which holes are designed in such a way that associated mounting feet 7 of the connection element 3 can be mounted. For example, the fastening rail 2 can be designed in the manner of a seat rail or can correspond to such a rail. The fastening rail 2 can thus for example be a component which is produced from aluminium or an aluminium alloy by means of an extrusion process and in which a plurality of holes 13 and slots (not shown) have been milled at regular intervals and so as to be interconnected. In this case, the fastening rail 2 can for example be adhered in the notch or fastened thereto using screws, studs etc.

Alternatively, however, this can also be a fastening rail 2 made of a plastics material. The rail can be produced for example in an injection moulding process. Furthermore, the fastening rail 2 can also be reinforced with fibres (e.g. glass or carbon fibres), which have been integrally bonded with a plastics material (e.g. a synthetic resin) in a pultrusion process or the like. In this embodiment, the fastening rail 2 can for example already be inserted as a semi-finished product into the walls 12 during the production thereof and integrally incorporated into the walls in a curing process or the like. Alternatively, however, the fastening rail 2 can also be adhered in the notch or it can have been fastened using other known methods.

If the fastening rail 2 is made of metal, said rail can be coated, at least in portions, with a protective layer made of polytetrafluoroethylene (e.g. Teflon) for protection against wear or damage. If the fastening rail 2 is made of plastics material, a protective layer made of a polyamide or a polyurethane etc. can be provided. Accordingly, the mounting feet 7 can also be covered, in portions or completely, with corresponding protective layers.

As shown in FIG. 1, both the notch 8 and the fastening rail 2 can be open at both ends of the housing side 5. For example, they can be flush with the corresponding side walls of the monument 1. It can furthermore be provided for the openings that thus remain to be covered with a cover, a lid made of plastics material or the like so that liquids or impurities cannot penetrate into the openings. This embodiment has the advantage that the fastening rail 2 can be easily mounted in the notch 8 by simply being slid into the notch 8 for example. Alternatively, however, it can also be provided for the fastening rail 2 to be completely embedded laterally in the housing side 5 without said side remaining laterally visible for inspection.

The embodiment of the connection element 3 shown by way of example in FIG. 1 is forked. The connection element comprises a pivot bearing 6, on which two connecting struts 9 are mounted, which are in turn each attached to the fastening rail 2 by means of one mounting foot 7 respectively.

The mounting feet 7 are shaped so as to correspond to the holes 13 in the fastening rail 2. In the case where the fastening rail 2 is designed in the manner of a seat rail, the mounting feet 7 can be fittings made of plastics material or metal, for example in the form of a slide such as is also used for fastening aircraft seats or similar components. Such fittings can be attached in a slidably displaceable manner for mounting on a rail. For example, there are fittings, the lower surface of which is shaped so as to precisely fit a portion consisting of holes and slots of the seat rail so that the fitting can be introduced into the receiving space 11 of the seat rail in a desired position. By means of light subsequent shifting, the fitting can be brought into a locked position, in which, due to the shape of the lower surface thereof, it cannot be lifted upwards out of the receiving space of the seat rail again (without shifting once more). In such a position, the fitting can be secured for example by means of a setting screw or a lever device and thus rigidly connected to the seat rail.

The connecting struts 9 can be produced from fibre-reinforced plastics material. For example, the connecting struts 9 can be pultruded, hollow or solid carbon profiles, i.e. can consist of carbon-fibre-reinforced plastics material (CFRP). Alternatively, embodiments made of metal, such as aluminium or titanium, are provided in any case. The connecting struts 9 can be bonded for example to the pivot bearing 6 and to the mounting feet 7 and/or fastened by means of interference fits, screw-in connections or the like. The connecting struts 9 can comprise reinforcing structures, such as longitudinal ribs or the like.

The pivot bearing 6 can be a simple metal component, such as is known to a person skilled in the art from various other applications. The tension rod 4, for example an extruded aluminium part, can be pivotally mounted in a hole in the pivot bearing in this case by means of a pin or the like. Furthermore, the tension rod 4 can have a symmetrical design, wherein a corresponding connection on the other side of the tension rod 4 is closed by the primary structure of the aircraft 100.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A monument for a cabin of a vehicle, comprising:
   an outer housing side; and
   a fastening rail for fastening connection elements in a longitudinal direction of the fastening rail in order to fix the monument in position inside the cabin,
   the fastening rail having a receiving space extending in the longitudinal direction of the fastening rail, which space is designed to receive and fasten a plurality of mounting feet of the connection elements to the fastening rail, and being embedded in the outer housing side.

2. The monument of claim 1, wherein the fastening rail is a notch in a wall of the outer housing side.

3. The monument of claim 1, wherein a notch is provided in a wall of the outer housing side, into which the fastening rail is inserted.

4. The monument of claim 3, wherein the fastening rail is inserted into the notch such that the fastening rail and the wall are flush with the outer housing side.

5. The monument of claim 3, wherein the fastening rail is adhered in the notch.

6. The monument of claim 1, wherein the fastening rail is formed having a plurality of regularly spaced holes in the receiving space, which holes are designed to receive and fasten mounting feet of connection elements to the fastening rail.

7. The monument of claim 1, wherein the fastening rail has a C profile.

8. The monument of claim 1, wherein the fastening rail is in the form of a seat rail.

9. The monument of claim 1, wherein the fastening rail is produced substantially from fibre-reinforced plastics material.

10. A fastening arrangement for fixing a position of a monument in side a cabin of an aircraft or spacecraft, the fastening arrangement comprising:
    a connection element having at least two mounting feet;
    a monument comprising:
       an outer housing side; and
       a fastening rail for fastening the connection element in a longitudinal direction of the fastening rail in order to fix the monument in position inside the cabin;
       the fastening rail having a receiving space extending in the longitudinal direction of the fastening rail, which space is designed to receive and fasten the mounting feet of the connection element to the fastening rail, and being embedded in the outer housing side;
    wherein the at least two mounting feet of the connection element are mounted at a distance from one another in the fastening rail of the monument; and
    a tension rod, which is mounted on the connection element, is connected to a structure of the aircraft or spacecraft, and fixes the monument in a position inside the cabin by means of the connection element.

11. The fastening arrangement of claim 10, wherein a pivot bearing is provided in the connection element, on which bearing the tension rod is pivotally mounted.

12. The fastening arrangement of claim 10, wherein rod-shaped connecting struts are provided in the connection element, which struts each connect one of the mounting feet respectively of the connection element to the pivot bearing.

13. The fastening arrangement of claim 12, wherein two connecting struts of the connection element form an isosceles triangle together with the outer housing side.

14. The fastening arrangement of claim 12, wherein the connecting struts are produced from fibre-reinforced plastics material.

15. A monument for a cabin of a vehicle, comprising:
    an outer housing side; and
    a fastening rail for fastening connection elements in a longitudinal direction of the fastening rail in order to fix the monument in position inside the cabin,
    the fastening rail having a receiving space extending in the longitudinal direction of the fastening rail, which space is designed to receive and fasten a plurality of mounting feet of the connection elements to the fastening rail, and being embedded in the outer housing side;

wherein a notch is provided in a wall of the outer housing side, into which the fastening rail is inserted; and wherein the fastening rail is inserted into the notch such that the fastening rail and the wall are flush with the outer housing side.

16. The monument of claim 15, wherein the fastening rail is formed having a plurality of regularly spaced holes in the receiving space, which holes are designed to receive and fasten mounting feet of connection elements to the fastening rail, and wherein the fastening rail has a C profile.

17. The monument of claim 16, wherein the fastening rail is in the form of a seat rail, and is produced from fibre-reinforced plastics material.

* * * * *